(12) United States Patent
Kim et al.

(10) Patent No.: US 9,388,782 B2
(45) Date of Patent: Jul. 12, 2016

(54) FUEL-INJECTION VALVE FOR AN INTERNAL COMBUSTION ENGINE

(75) Inventors: Dong-Hun Kim, Ulsan (KR); Tae-Hyung Park, Ulsan (KR)

(73) Assignee: HYUNDAI HEAVY INDUSTRIES, CO., LTD., Ulsan (KR)

( * ) Notice: Subject to any disclaimer, the term of this patent is extended or adjusted under 35 U.S.C. 154(b) by 497 days.

(21) Appl. No.: 13/881,914

(22) PCT Filed: Oct. 27, 2011

(86) PCT No.: PCT/KR2011/008048
§ 371 (c)(1),
(2), (4) Date: Apr. 26, 2013

(87) PCT Pub. No.: WO2012/057530
PCT Pub. Date: May 3, 2012

(65) Prior Publication Data
US 2013/0214065 A1    Aug. 22, 2013

(30) Foreign Application Priority Data

Oct. 28, 2010    (KR) .................. 10-2010-0105734

(51) Int. Cl.
*F02M 45/08*    (2006.01)
*F02M 61/10*    (2006.01)
(Continued)

(52) U.S. Cl.
CPC ........... *F02M 61/10* (2013.01); *F02D 19/0694* (2013.01); *F02D 19/105* (2013.01);
(Continued)

(58) Field of Classification Search
CPC ..... F02M 45/04; F02M 45/086; F02M 67/02; F02M 47/043; F02M 2200/46; F02M 61/10; F02M 61/042; F02M 61/182; F02M 61/1826; F02M 47/027; F02M 61/20; F02D 19/0694; F02D 19/105; Y02T 10/36
USPC .............................. 239/87, 86, 584, 585.5, 88
See application file for complete search history.

(56) References Cited

U.S. PATENT DOCUMENTS

| 5,884,611 A * | 3/1999 | Tarr ....................... F02M 67/12 |
| | | 123/531 |
| 6,371,093 B1 * | 4/2002 | Kaku ................. F02M 51/0653 |
| | | 123/531 |

(Continued)

FOREIGN PATENT DOCUMENTS

| EP | 0610584 B1 | 9/1996 |
| JP | 02-033463 A | 2/1990 |

(Continued)

*Primary Examiner* — Arthur O Hall
*Assistant Examiner* — Juan C Barrera
(74) *Attorney, Agent, or Firm* — Rabin & Berdo, P.C.

(57) ABSTRACT

Disclosed herein is a fuel injection valve for an internal combustion engine. The fuel injection valve includes a valve body (10), a nozzle (20), a valve plate (30), a main needle spindle (40), a main needle (50), a main needle spring (60), a spring plate (70), a pilot needle spring (80), a pilot needle spindle (90) and a pilot needle (100). In the present invention, both the main needle and the pilot needle are opened or only the pilot needle is opened by compressed high-pressure fuel oil or compressed air, thereby enabling main injection and pilot injection to be separately performed by the single fuel-injection valve. Furthermore, because opening of the main needle valve can be controlled by compressed air for ignition or control of an engine, only the pilot injection may be conducted even without using a separate compression apparatus or the like.

6 Claims, 4 Drawing Sheets

(51) Int. Cl.
*F02M 45/04* (2006.01)
*F02M 47/02* (2006.01)
*F02M 61/18* (2006.01)
*F02M 61/20* (2006.01)
*F02D 19/06* (2006.01)
*F02D 19/10* (2006.01)
*F02M 61/04* (2006.01)
*F02M 67/02* (2006.01)
*F02M 47/04* (2006.01)

(52) U.S. Cl.
CPC ............ *F02M 45/04* (2013.01); *F02M 45/086* (2013.01); *F02M 47/027* (2013.01); *F02M 47/043* (2013.01); *F02M 61/042* (2013.01); *F02M 61/182* (2013.01); *F02M 61/1826* (2013.01); *F02M 61/20* (2013.01); *F02M 67/02* (2013.01); *F02M 2200/46* (2013.01); *Y02T 10/36* (2013.01)

(56) References Cited

U.S. PATENT DOCUMENTS

| | | | |
|---|---|---|---|
| 6,637,675 B2 * | 10/2003 | Carroll, III | F02M 45/086 239/124 |
| 7,104,477 B2 * | 9/2006 | Kilgore | F02M 51/0682 239/533.2 |
| 2006/0060673 A1 * | 3/2006 | Mack | F02M 45/086 239/533.2 |
| 2008/0163852 A1 * | 7/2008 | Kanne | F02M 45/086 123/472 |

FOREIGN PATENT DOCUMENTS

| | | |
|---|---|---|
| JP | 2004-028064 A | 1/2004 |
| JP | 2007-023969 A | 2/2007 |
| JP | 2009-275646 A | 11/2009 |

* cited by examiner

FUEL-INJECTION VALVE FOR AN INTERNAL COMBUSTION ENGINE

TECHNICAL FIELD

The present invention relates, in general, to fuel injection valves for internal combustion engines and, more particularly, to a fuel injection valve for an internal combustion engine which is configured such that, when it is used in a diesel engine or a dual-fuel engine that can alternate between diesel fuel operation and gas fuel operation, high-pressure diesel fuel can be injected into a combustion chamber in such a way that main injection and pilot injection are simultaneously conducted, or only a small amount of fuel oil is injected into the combustion chamber in a pilot injection manner.

BACKGROUND ART

Generally, conventional fuel injection valves for internal combustion engines include a needle and a spring which are operated such that if the pressure of fuel supplied to the valve is higher than the opening pressure of the valve, a valve flow passage opens, and if it is not, the valve flow passage remains closed. When high-pressure fuel is supplied from a fuel pump to the fuel injection valve, if pressure higher than the opening pressure is formed in the fuel injection valve, the pressure of fuel oil pushes the needle upwards while overcoming the force with which the spring pushes the needle downwards. Thereby, the valve flow passage opens. Then, fuel is injected into a cylinder through several nozzle holes which are formed in an end of a nozzle. In this injection method, all of the nozzle holes are opened or closed according to a single injection mechanism with a single preset opening pressure. Therefore, in low-load operation in which injection pressure of fuel is comparatively low, conditions of fuel spray deteriorate, whereby the combustion efficiency is reduced.

In the case of a dual-fuel engine that can alternate between diesel fuel operation and gas fuel operation, when the engine is in a diesel mode in which diesel fuel is used to operate the engine, fuel is injected into a combustion chamber by a conventional mechanical fuel pump and a fuel injection valve. On the other hand, in a gas mode in which the engine is operated by gas fuel, a separate electronic control fuel injection system (a common rail fuel injection system) is typically used for pilot injection in which only a small amount of fuel appropriate to function as an ignition source of a gas mixer is injected along with compressed air supplied into the combustion chamber.

Introduced as representative examples of fuel injection valves of the convention dual-fuel engines, a method of MAN Co. and a method of Wartsilla Co. will be described below. In the method of MAN Co., main injection operation for a diesel mode using a mechanical fuel pump and pilot injection operation for a gas mode using a common rail fuel injection system are performed by respective fuel injection valves. In this case, there is a problem in that the structure of a cylinder head is complicated due to installation of the fuel injection valves.

In the case of the method of Wartsilla Co., so as to simplify the installation structure of the fuel injection valves, needles and nozzle holes for main injection operation for a diesel mode using a mechanical fuel pump and pilot injection operation for a gas mode using a common rail fuel injection system are installed and arranged in a row in a single fuel injection valve such that the main injection and the pilot injection can be conducted by the single fuel injection valve. However, this case is problematic in that, even when only either the main injection operation or the pilot injection operation malfunctions or an element related to either of them is damaged, the entirety of the fuel injection valve must be replaced with a new one.

DISCLOSURE

Technical Problem

Accordingly, the present invention has been made keeping in mind the above problems occurring in the prior art, and an object of the present invention is to provide a fuel injection valve for an internal combustion engine, in which both a main needle and a pilot needle are opened or only the pilot needle is opened by compressed high-pressure fuel oil or compressed air, thereby enabling main injection and pilot injection to be separately performed by the single fuel-injection valve.

Another object of the present invention is to provide a fuel injection valve for an internal combustion engine in which, because opening of a main needle valve is controlled by compressed air for ignition or control of an engine, only the pilot injection may be conducted even without using a separate compression apparatus or the like.

Technical Solution

In order to accomplish the above objects, the present invention provides a fuel injection valve for an internal combustion engine, including: a valve body; a nozzle coupled to a lower end of the valve body; a valve plate installed in the valve body, with a compressed air chamber formed in an upper portion of the valve plate; a main needle spindle disposed in a lower end of the valve plate; a main needle installed in the nozzle and disposed under a lower end of the main needle spindle, the main needle opening a valve flow passage formed in the nozzle using supplied compressed fuel oil so that fuel is injected through a main injection hole, the main needle having a pilot supply port; a main needle spring interposed between the main needle spindle and the valve plate; a spring plate inserted at a lower portion thereof into the valve plate, the spring plate having an air supply hole in an upper portion thereof so that air is supplied into the compressed air chamber through the air supply hole; a pilot needle spring disposed under a lower end of the spring plate; a pilot needle spindle disposed under a lower end of the pilot needle spring; a pilot needle provided in the main needle and disposed under a lower end of the pilot needle spindle, the pilot needle being operated by fuel oil supplied through the pilot supply port of the main needle, whereby a valve flow passage formed in the main needle is opened so that fuel is injected through a pilot injection hole.

As described above, in the present invention, a fuel injection function includes a main injection function in which fuel is injected through a main nozzle hole and a pilot nozzle hole by opening both a main needle and a pilot needle, and a pilot injection function in which fuel is injected only through the pilot nozzle hole by opening the pilot needle. Therefore, an engine can be operated in different ways depending on an injection mode using only a single fuel injection valve.

Furthermore, because the main injection function and the pilot injection function are separately provided, a dual-fuel engine can be operated both in a gas mode and a diesel mode. Therefore, if the present invention is used in a dual-fuel engine, fuel can be injected by an appropriate injection method depending on an operation mode.

In addition, since the present invention provides the main injection function and the pilot injection function, when it is applied to the dual-fuel engine, fuel injection valves for dual fuels can be integrated into a single fuel injection valve. Therefore, the construction of the fuel injection valve can be simplified, and space required to install the fuel injection valve can be easily provided.

Further, in the case where the present invention is used in a typical diesel engine, when the engine is in a low-load operation mode, only pilot injection is performed. Therefore, high-pressure injection can be conducted even in the low-load operation mode, whereby fuel efficiency is improved, and harmful exhaust emissions can be reduced.

Moreover, when the pilot injection is conducted, compressed air for ignition or control of the engine is used to interrupt the opening of the main needle. Hence, a separate air compressor is not required, and a problem of mixing of oil and fuel oil which may be caused when oil such as lubricating oil is used to interrupt the opening of the needles can be prevented.

Furthermore, the present invention does not require a separate electronic control fuel injection system (a common rail fuel injection system) which is used for pilot injection in a dual-fuel engine. Therefore, the production cost can be reduced.

In addition, the general construction of the present invention is comparatively simple, so that the production cost is reduced, maintenance and repairs are facilitated, and a space required to install the fuel injection valve can be easily provided.

DESCRIPTION OF THE ELEMENTS IN THE DRAWINGS (10): valve body (20): nozzle
(21): main nozzle hole (22): pilot nozzle hole
(23): fuel oil pocket
(24, 24a, 24b, 24c): sac volume
(30): valve plate (31): compressed air chamber
(32): upper space (33): lower space
(40): main needle spindle
(50): main needle (51): pilot supply port
(52, 52a, 52b): lower end (53, 53a, 53b): flow passage
(60): main needle spring (70): spring plate
(71): air supply hole (80): pilot needle spring
(90): pilot needle spindle (100): pilot needle
(110): fuel oil supply passage

BEST MODE

Figure 1:
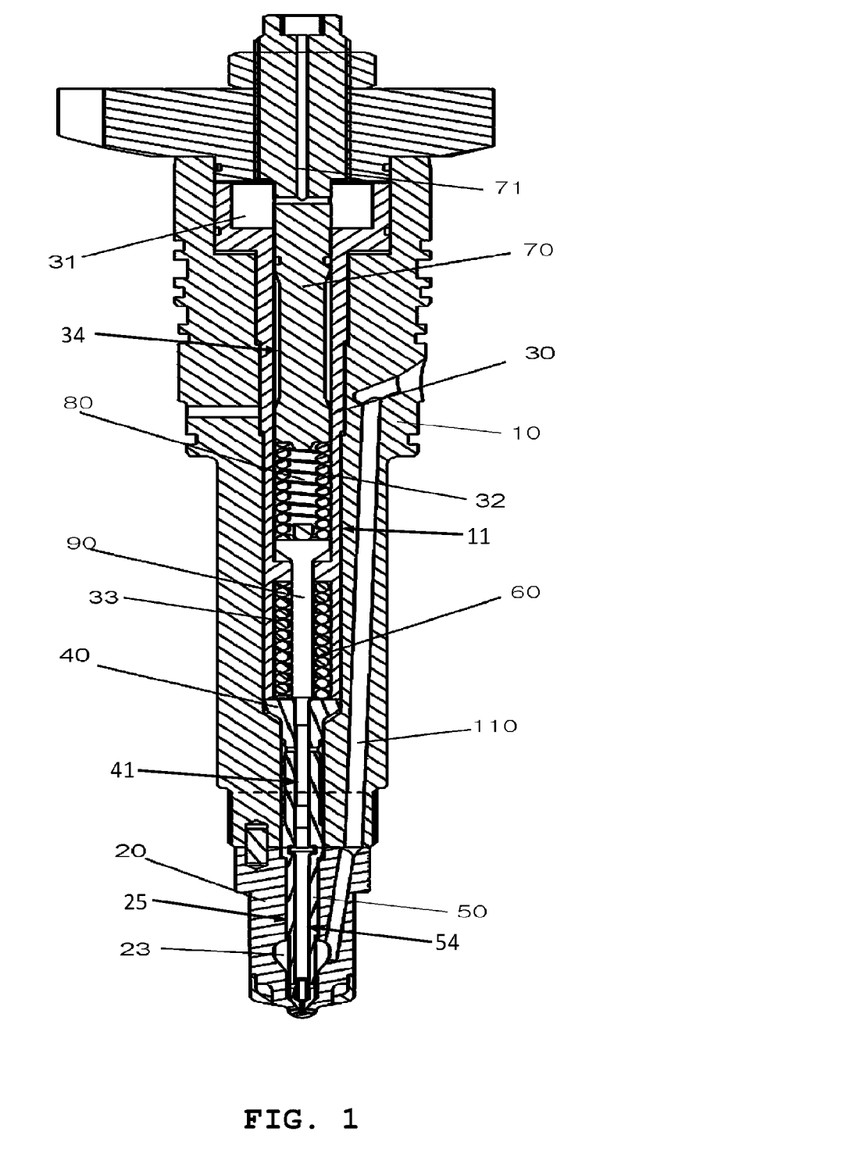
FIG. 1 is a view illustrating the construction of a fuel injection valve, according to the present invention.
Figure 2:
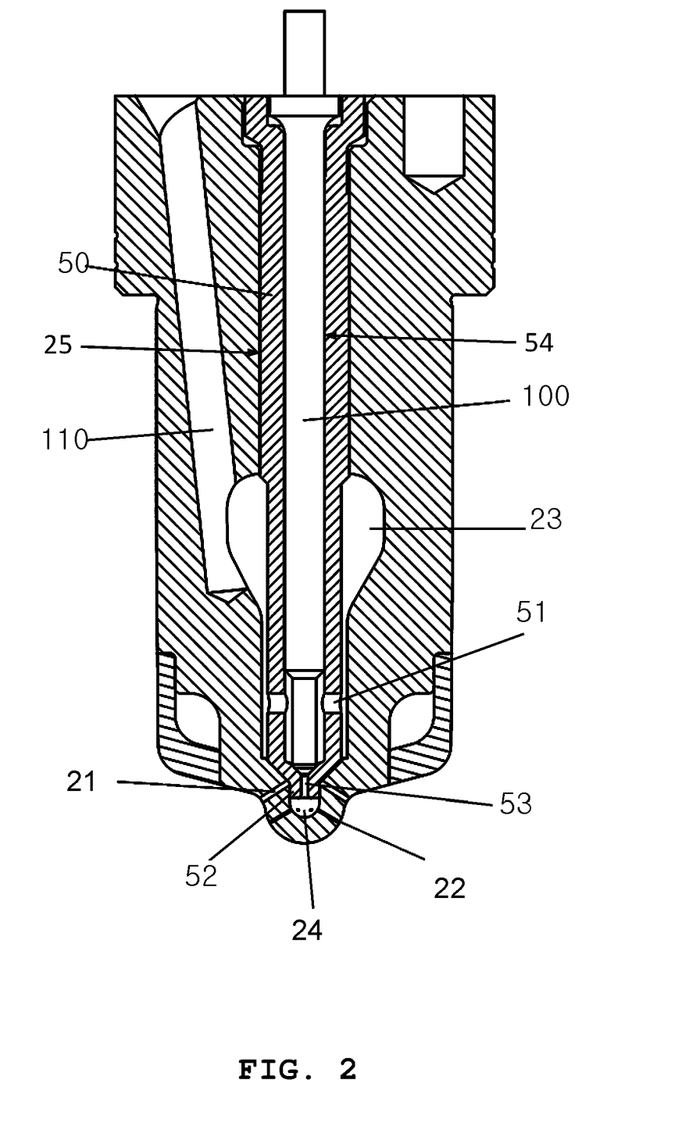
FIG. 2 is a detailed view illustrating the construction of a fuel nozzle according to the present invention.
Figure 3:
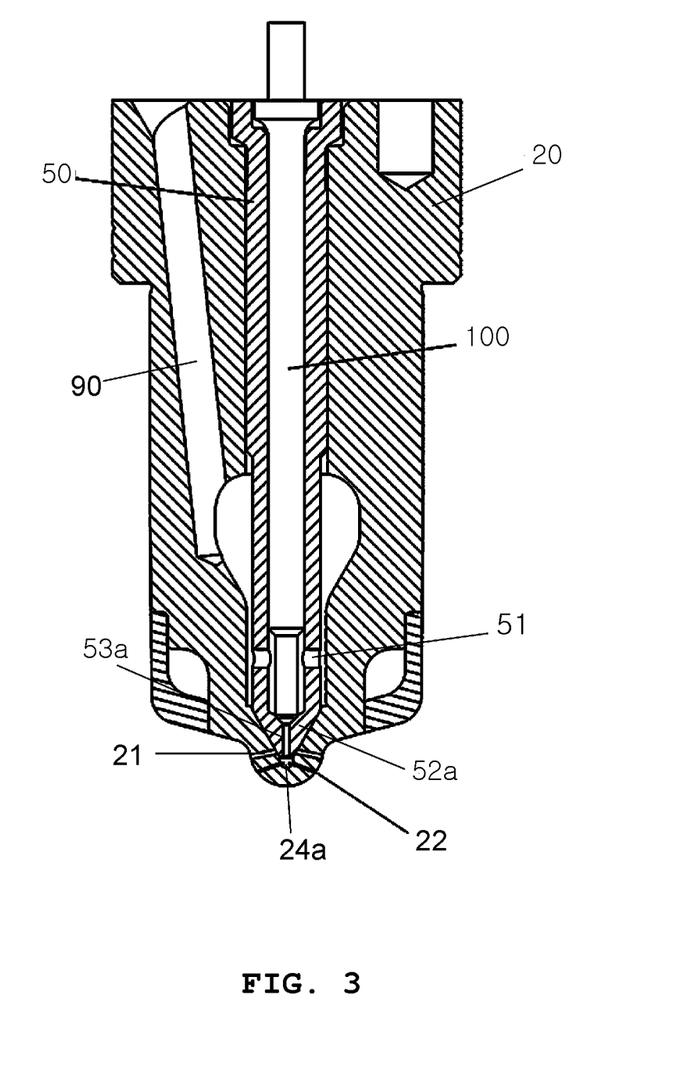
FIG. 3 is a view illustrating the construction of a modification of the fuel nozzle according to the present invention.
Figure 4:
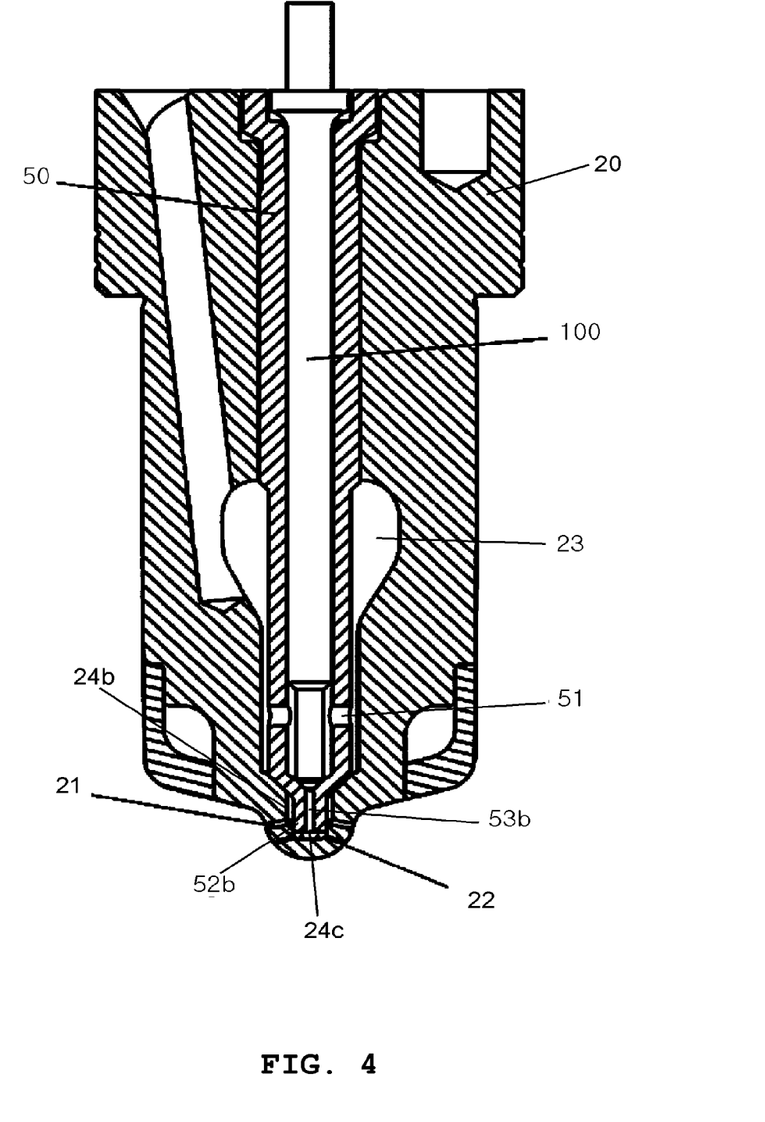
FIG. 4 is a view illustrating the construction of another modification of the fuel nozzle according to the present invention.

FIG. 1 is a view illustrating the construction of the present invention. FIG. 2 is a detailed view illustrating the construction of the present invention. FIG. 3 is a view illustrating a modification of the construction of the present invention. FIG. 4 is a view illustrating another modification of the construction of the present invention.

The present invention includes a valve body 10, a nozzle 20, a valve plate 30, a main needle spindle 40, a main needle 50, a main needle spring 60, a spring plate 70, a pilot needle spring 80, a pilot needle spindle 90 and a pilot needle 100. The nozzle 20 is coupled to a lower end of the valve body 10. The valve plate 30 is installed in a first hollowed space 11 formed inside the valve body 10. A compressed air chamber 31 is formed in an upper portion of the valve plate 30. The main needle spindle 40 is disposed in a lower end of the valve plate 30. The main needle 50 is installed in a second hollowed space 25 formed inside the nozzle 20 in such a way that the main needle 50 is disposed under a lower end of the main needle spindle 40. The main needle 50 opens a valve flow passage formed in the nozzle 20 using supplied compressed fuel oil so that fuel is injected through a main nozzle hole 21. The main needle 50 has a pilot supply port 51. The main needle spring 60 is interposed between the main needle spindle 40 and the valve plate 30. The spring plate 70 is inserted at a lower portion thereof into a third hollowed space 34 formed inside the valve plate 30. The spring plate 70 has an air supply hole 71 in an upper portion thereof so that air is supplied into the compressed air chamber 31 through the air supply hole 71. The pilot needle spring 80 is disposed under a lower end of the spring plate 70. The pilot needle spindle 90 is disposed under a lower end of the pilot needle spring 80 such that the pilot needle spindle 90 extends over the third hollowed space 34 of the valve plate 30 and a fourth hollowed space 41 formed inside the main needle spindle 40. The pilot needle 100 is provided in a fifth hollowed space 54 formed inside the main needle 50 in such a way that the pilot needle 100 is disposed under a lower end of the pilot needle spindle 90. The pilot needle 100 is operated by fuel oil supplied through the pilot supply port 51 of the main needle 50, whereby a valve flow passage formed in the main needle 50 is opened so that fuel is injected through a pilot injection hole 22.

The valve body 10 is integrally coupled at the lower end thereof to the nozzle 20. A fuel oil supply passage 110 which is used for supply of fuel oil is formed in the valve body 10 and the nozzle 20. A fuel oil pocket 23 which communicates with the fuel oil supply passage 110 is formed in the nozzle 20.

The valve plate 30 has the compressed air chamber 31 in the upper portion thereof. Further, the valve plate 30 has an upper space 32 in which the pilot needle spring 80 is installed, and a lower space 33 in which the main needle spring 60 is disposed.

The main needle spindle 40 is disposed under the valve plate 30 such that an upper portion thereof is brought into contact with the main needle spring 60. The main needle spindle 40 is installed on the main needle 50 such that a lower portion thereof is brought into contact with the main needle 50. The main needle 50 is installed in the nozzle 20, and the pilot supply port 51 through which fuel oil is supplied into the pilot needle 100 is formed in a lower portion of the main needle 50.

A lower end of the spring plate 70 makes contact with the pilot needle spring 80 and supports it. The air supply hole 71 through which compressed air is supplied into the compressed air chamber 31 is formed in the spring plate 70.

The pilot needle spindle 90 is installed in the main needle spindle 40 such that an upper portion of the pilot needle spindle 90 makes contact with the pilot needle spring 80 provided in the upper space 32, and a lower portion thereof is brought into contact with the pilot needle 100 while the pilot needle spindle 90 passes through the main needle spring 60 installed in the lower space 33.

Furthermore, an opening pressure of the pilot needle 100 can be adjusted in such a way that the tensile force of the pilot needle spring 80 is changed by varying the position of the spring plate 70.

In the present invention having the above-mentioned construction, as fuel oil is supplied into the fuel oil pocket through the fuel oil supply passage, the pressure of supplied fuel oil is increased, whereby the main needle and the main needle spindle move upwards while compressing the main needle spring. The valve flow passage is opened by the upward movement of the main needle, so that fuel oil is injected through the main nozzle hole.

Furthermore, when the pressure of fuel oil that is supplied through the pilot supply port of the main needle reaches the opening pressure of the pilot needle, the pilot needle disposed in the main needle and the pilot needle spindle disposed in the main needle spindle move upwards while compressing the pilot needle spring. The valve flow passage in the main needle is opened by the upward movement of the pilot needle, whereby fuel oil is injected through a pilot nozzle hole.

In this way, main injection in which fuel oil is injected through the main nozzle hole and the pilot nozzle hole at the same time is performed by supply of fuel oil.

Furthermore, in the present invention, when an engine starts or compressed air for control is supplied into the compressed air chamber through the air supply hole of the spring plate, the valve plate is pushed downwards by pressure of the supplied compressed air. The main needle and the main needle spindle are fixed in position by the above operation of the valve plate.

As such, if fuel oil is supplied into the fuel oil pocket through the fuel oil supply passage after the main needle and the main needle spindle have been fixed in position, although the pressure of fuel oil which is being supplied is increased, the main needle and the main needle spindle do not move upwards. The high-pressure fuel oil supplied to the fuel oil pocket is supplied towards the pilot needle through the pilot supply port of the main needle. When the pressure of the fuel oil that is being supplied reaches the opening pressure of the pilot needle, the pilot needle and the pilot needle spindle which are respectively disposed in the main needle and the main needle spindle move upwards while compressing the pilot needle spring. The valve flow passage of the main needle is opened by the upward movement of the pilot needle, whereby fuel oil is injected through the pilot nozzle hole. That is, only pilot injection is conducted.

Hereinafter, operation processes of the present invention according to the main injection (the simultaneous injection through the main nozzle hole and the pilot nozzle hole) and the pilot injection (the injection through the pilot nozzle hole) will be explained.

Main Injection

Fuel oil is compressed by a mechanical fuel pump and transferred into the fuel injection valve. As the pressure of fuel oil increases, when the force generated by pressure applied to working surfaces of the main needle and the pilot needle is greater than the force generated from the main needle spring and the pilot needle spring, the flow passage of the valve is opened by upward movement of the main needle and the pilot needle. Then, fuel begins to be injected through the main nozzle hole and the pilot nozzle hole. Here, if the opening pressure of the pilot needle is greater than that of the main needle, the main needle opens earlier than the pilot needle, so that injection of fuel through the main nozzle hole begins first. If the opening pressure of the pilot needle is less than that of the main needle, the pilot needle opens earlier than the main needle, whereby injection of fuel through the pilot nozzle hole begins first. Combustion is mainly conducted by fuel that is injected through the main nozzle hole which is disposed at an upper position. Fuel is also injected through the pilot nozzle hole which is disposed at a lower position. The injection of fuel through the pilot nozzle hole that is disposed at the lower position also functions to prevent the pilot nozzle hole, which has a relatively small diameter, from being clogged during the combustion process.

The main injection is associated with a 'diesel mode' of a dual-fuel engine or a 'high load operation mode' of a typical diesel engine.

Pilot Injection

As compressed air is supplied into the compressed air chamber, the pressure of air supplied into the compressed air chamber pushes the valve plate. In the same manner as the main injection, the pressure of fuel oil supplied form the mechanical fuel pump is applied to the working surfaces of the main needle and the pilot needle. However, in the case of the pilot injection, the pressure of compressed air applied to the valve plate is greater than the pressure of fuel oil applied to the working surface of the main needle, the main needle is not opened. Therefore, fuel is not injected through the main nozzle hole that is disposed at the upper position. Meanwhile, the valve flow passage of the pilot needle is normally opened by the pressure of fuel, and fuel is injected through the pilot nozzle hole that is formed at the lower position. The pilot nozzle hole is designed such that a flow area thereof is less than that of the main nozzle hole. Particularly, the nozzle hole is designed such that the flow area thereof is very small so that, when the pilot injection is conducted for ignition in a gas mode of the dual-fuel engine, only a small amount of fuel appropriate to function as an ignition source of a gas mixer can be injected along with compressed air supplied into the combustion chamber. Compressed air for ignition or control of the engine is used as compressed air supplied into the compressed air chamber.

To change back to the main injection, the supply of compressed air into the compressed air chamber is interrupted and the compressed air that has been supplied thereinto is discharged. Then, the main needle spring pushes the valve plate upwards and returns it to its original position.

As such, in the case of the pilot injection, fuel is not injected through the main nozzle hole. In the present invention, the design of the fuel nozzle can be changed into various modifications. These modifications will be described in detail with reference to the attached drawings.

FIG. 2 is a detailed view illustrating the construction of the fuel nozzle according to the present invention. A lower end 52 of the main needle protrudes downwards from the body of the main needle such that airtightness is maintained between a valve seat part, in which the main nozzle hole 21 is formed, and a sac volume 24, in which the pilot nozzle hole 22 is formed. A flow passage 53 is formed in the lower end 52 of the main needle that protrudes from the body of the main needle. The sac volume 24 that communicates with the pilot nozzle hole 22 and the flow passage 53 is formed below the main needle 50 in the nozzle 20.

As such, the present invention is configured such that an entrance of the main nozzle hole 21 is directly closed by the main needle 50. Therefore, when the main needle moves upwards, the main nozzle hole 21 opens so that fuel that has passed through the valve flow passage is directly injected through the main nozzle hole 21. Meanwhile, in the case of the pilot nozzle hole 22, fuel that has passed through the corresponding valve flow passage passes through the flow passage 53 and the sac volume 24 before being injected through the pilot nozzle hole 22.

FIG. 3 is a view illustrating the construction of a modification of the fuel nozzle according to the present invention. This modification has a sac volume that is smaller than that of the fuel nozzle of FIG. 2. That is, the present invention is configured such that a lower end 52a of the main needle has the same tapered shape as that of the valve seat part in which main nozzle hole 21 is formed, and the lower end 52a closes only the main nozzle hole 21. Further, a flow passage 53a is formed in the lower end 52a of the main needle. In addition, the sac volume 24a which communicates with the pilot nozzle hole 22 and the flow passage 53a is formed below the main needle 50 in the nozzle 20.

In the present invention having this construction, in the case of FIG. 2, as the maximum lift of the main needle is set, when the main injection is carried out, if the pilot needle is not operated, fuel is not injected through the pilot nozzle hole. Meanwhile, in the case of FIG. 3, when the main needle moves upwards, the lower end of the main needle that has a tapered shape moves upwards and opens the main nozzle hole. Simultaneously, the valve flow passage communicates with the pilot nozzle hole. Hence, fuel is injected through both the main nozzle hole and the pilot nozzle hole.

FIG. 4 is a view illustrating the construction of another modification of the fuel nozzle according to the present invention. In this modification, a lower end 52b of the main needle protrudes downwards from the body of the main needle such that airtightness is maintained between sac volumes in which the main nozzle hole 21 and the pilot nozzle hole 22 are respectively formed. A sac volume 24b is formed between the lower end 52b of the main needle and a lower portion of the valve seat. The main nozzle hole 21 communicates with the sac volume 24b. A flow passage 53b is formed in the lower end 52b of the main needle. Another sac volume 24c which communicates with the pilot nozzle hole 22 and the flow passage 53b is formed below the main needle 50 in the nozzle 20.

In the present invention having the above-mentioned construction, the main nozzle hole and the pilot nozzle hole are configured such that fuel that has passed through the valve flow passage is injected through the main nozzle hole and the pilot nozzle hole after passing through the sac volume that is a predetermined space.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A fuel injection valve for an internal combustion engine, comprising:
    a valve body having a first hollowed space formed inside the valve body;
    a nozzle having a second hollowed space formed inside the nozzle and coupled to a lower end of the valve body such that the first hollowed space and the second hollowed space are linked with each other;
    a valve plate disposed inside the first hollowed space of the valve body and having
        a third hollowed space formed inside the valve plate, and
        a compressed air chamber formed in an upper inside portion of the valve plate;
    a main needle spindle disposed inside the first hollowed space of the valve body in a lower end side of the valve plate and having a fourth hollowed space formed inside the main needle spindle;
    a main needle disposed inside the second hollowed space of the nozzle such that an upper end of the main needle contacts with a lower end of the main needle spindle and having a fifth hollowed space formed inside the main needle, the main needle configured to be opened by pressure of fuel and inject the fuel through a main nozzle hole, the main needle having a pilot supply port formed in a lower portion of a side wall of the main needle;
    a main needle spring interposed between the main needle spindle and the valve plate;
    a spring plate inserted at a lower portion thereof into the third hollowed space of the valve plate, the spring plate having an air supply hole formed in an upper portion thereof so that air is supplied into the compressed air chamber through the air supply hole;
    a pilot needle spring disposed inside the third hollowed space under a lower end of the spring plate;
    a pilot needle spindle extending over the third hollowed space of the valve plate and the fourth hollowed space of the main needle spindle under a lower end of the pilot needle spring;
    a pilot needle disposed inside the fifth hollowed space of the main needle under a lower end of the pilot needle spindle and configured to be opened by pressure of the fuel supplied through the pilot supply port of the main needle and inject the fuel through a pilot nozzle hole,
    wherein the compressed air chamber is formed by an inner periphery surface of an upper portion of the valve plate and an outer periphery surface of an upper portion of the spring plate.

2. The fuel injection valve for an internal combustion engine of claim 1, wherein the third hollowed space of the valve plate has an upper space in which the pilot needle spring is installed; and a lower space in which the main needle spring is installed, wherein the upper space and the lower space are separated from each other.

3. The fuel injection valve for an internal combustion engine of claim 1, wherein an opening pressure of the pilot needle is adjusted in such a way that tensile force of the pilot needle spring is changed by varying a position of the spring plate.

4. The fuel injection valve for an internal combustion engine of claim 1, wherein the main needle has a protruding part in a lower end of the main needle and a flow passage formed in the protruding part of the main needle, and
    wherein the nozzle has a sac volume disposed in a lower end portion of the second hollowed space of the nozzle and formed by the protruding part of the main needle and the nozzle, the sac volume communicating with the pilot nozzle hole and the flow passage.

5. The fuel injection valve for an internal combustion engine of claim 1, wherein the main needle has a tapered part in a lower end thereof such that the tapered part is configured to close only the main nozzle hole, and a flow passage formed in the tapered part of the main needle, and
    wherein the nozzle has a sac volume disposed in a lower end portion of the second hollowed space of the nozzle and formed by the main needle and the nozzle, the sac volume communicating with the pilot nozzle hole and the flow passage.

6. The fuel injection valve for an internal combustion engine of claim 1, wherein the main needle has a protruding part in a lower end of the main needle and a flow passage formed in the protruding part of the main needle, and wherein the nozzle has a first sac volume formed by a lateral side of the protruding part of the main needle and the nozzle, the main nozzle hole communicates with the first sac volume, and a second sac volume formed by a bottom side of the protruding part of the main needle and the nozzle, the second sac volume communicating with the pilot nozzle hole and the flow passage.

* * * * *